(12) United States Patent
Walli et al.

(10) Patent No.: US 12,545,196 B2
(45) Date of Patent: *Feb. 10, 2026

(54) SPLITTER HARNESS FOR VEHICLES WITH A PROPRIETARY INTERFACE PORT CONNECTOR

(71) Applicant: Geotab Inc., Oakville (CA)

(72) Inventors: Thomas Arthur Walli, Hamilton (CA); Jimmy Joe Pasquin, Woodbridge (CA)

(73) Assignee: Geotab Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,960

(22) Filed: Apr. 8, 2024

(65) Prior Publication Data
US 2025/0282309 A1    Sep. 11, 2025

Related U.S. Application Data

(60) Provisional application No. 63/561,986, filed on Mar. 6, 2024.

(51) Int. Cl.
*B60R 16/02* (2006.01)
*B60R 16/023* (2006.01)
*H01R 13/642* (2006.01)
*H01R 27/02* (2006.01)

(52) U.S. Cl.
CPC ...... *B60R 16/0207* (2013.01); *B60R 16/0234* (2013.01); *H01R 27/02* (2013.01); *H01R 13/642* (2013.01); *H01R 2201/26* (2013.01)

(58) Field of Classification Search
None
See application file for complete search history.

(56) References Cited

U.S. PATENT DOCUMENTS 4,057,310 A * 11/1977 Young ............... B60D 1/62
439/35
4,280,062 A * 7/1981 Miller ............... B60Q 1/18
315/83

(Continued)

FOREIGN PATENT DOCUMENTS

CN       202333366 U * 7/2012
EP       0569820 B1 * 3/1996 ........... H01R 13/684

(Continued)

OTHER PUBLICATIONS

Original and Translation of CN108448350 (Year: 2018).*

(Continued)

*Primary Examiner* — Timothy J. Dole
*Assistant Examiner* — Muhammed Azam
(74) *Attorney, Agent, or Firm* — Sherif A. Abdel-Kader

(57) ABSTRACT

A splitter harness includes a main harness segment having a first multi-wire harness connector and a second multi-wire harness connector at both ends thereof, an On-Board Diagnostic (OBD) port harness segment having an OBD port connector at an end thereof, a signal splitter, and a power signal provider for providing power to the OBD port connector. A method of installing the splitter harness includes unplugging the vehicle connector cable connectors, connecting the harness connectors, and connecting the power signal provider to a power source.

17 Claims, 17 Drawing Sheets

(56) References Cited

U.S. PATENT DOCUMENTS

| | | | | |
|---|---|---|---|---|
| 4,415,217 A * | 11/1983 | Clabburn | H01R 31/02 | 439/651 |
| 4,815,984 A * | 3/1989 | Sugiyama | B60R 16/0239 | 296/146.7 |
| 4,822,956 A * | 4/1989 | Sepe | H01B 11/125 | 174/74 A |
| 4,842,524 A * | 6/1989 | Hopkins | H01R 25/003 | 439/651 |
| 4,910,641 A * | 3/1990 | Yanase | B60R 16/0207 | 439/211 |
| 5,184,960 A * | 2/1993 | Hopkins | H01R 29/00 | 439/639 |
| 5,442,170 A * | 8/1995 | Kreft | H01R 29/00 | 385/15 |
| 5,442,332 A * | 8/1995 | Hughes | B60Q 1/305 | 340/463 |
| 5,443,389 A * | 8/1995 | Hughes | B60D 1/64 | 439/651 |
| 5,491,418 A * | 2/1996 | Alfaro | G01R 31/007 | 340/3.1 |
| 5,507,668 A * | 4/1996 | Lambrinos | H02G 3/00 | 439/502 |
| 5,555,498 A * | 9/1996 | Berra | G06F 11/2733 | 701/34.3 |
| 5,610,447 A * | 3/1997 | Nishikawa | H01R 31/08 | 174/72 A |
| 5,771,575 A * | 6/1998 | Onizuka | B60K 35/60 | 174/72 A |
| 5,954,538 A * | 9/1999 | Huang | H01R 31/02 | 439/502 |
| 5,971,799 A * | 10/1999 | Swade | H01R 27/02 | 439/502 |
| 6,120,327 A * | 9/2000 | O'Brien | B60R 16/0215 | 174/72 A |
| 6,280,243 B1 * | 8/2001 | Liu | H01R 13/64 | 439/502 |
| 6,531,657 B1 * | 3/2003 | Jones, Jr. | H01R 31/06 | 439/502 |
| 6,621,688 B1 * | 9/2003 | Burdick | B60R 16/0238 | 361/627 |
| 6,663,420 B1 * | 12/2003 | Xiao | H01R 31/065 | 439/502 |
| 6,672,896 B1 * | 1/2004 | Li | G06F 3/023 | 439/502 |
| 6,702,607 B2 * | 3/2004 | Kondo | H05K 1/118 | 174/72 A |
| 6,738,856 B1 * | 5/2004 | Milley | G01J 3/0264 | 710/316 |
| 6,824,401 B2 * | 11/2004 | Kuo | H01R 4/12 | 439/92 |
| 6,913,482 B1 * | 7/2005 | Wu | H01R 25/003 | 439/502 |
| D513,605 S * | 1/2006 | Lin | D13/133 | |
| 6,988,053 B2 * | 1/2006 | Namaky | G01R 31/007 | 324/426 |
| 7,057,108 B1 * | 6/2006 | Sodemann | H01R 13/7135 | 439/639 |
| 7,225,065 B1 * | 5/2007 | Hunt | H01R 12/675 | 701/33.2 |
| 7,344,406 B2 * | 3/2008 | Wolf | H01R 13/639 | 439/505 |
| 7,572,143 B2 * | 8/2009 | Harris | H01R 31/005 | 439/502 |
| 7,778,749 B2 * | 8/2010 | McGee | H01R 31/065 | 701/33.2 |
| 7,885,739 B2 * | 2/2011 | Chinnadurai | G07C 5/0858 | 701/1 |
| 8,064,960 B2 * | 11/2011 | Wisnewski | H01Q 1/3208 | 455/562.1 |
| 8,249,759 B2 * | 8/2012 | Lazzara | B60R 25/045 | 307/10.6 |
| 8,298,003 B2 * | 10/2012 | Wu | H01R 27/02 | 439/501 |
| 8,308,507 B2 * | 11/2012 | Lin | H01R 27/02 | 439/502 |
| 8,333,492 B2 * | 12/2012 | Dingman | B60Q 1/26 | 362/399 |
| 8,340,861 B2 * | 12/2012 | Lipscomb | G07C 5/0808 | 701/33.2 |
| 8,517,772 B2 * | 8/2013 | Wu | H01R 24/62 | 439/501 |
| 8,535,090 B2 * | 9/2013 | Su | H01R 27/02 | 439/502 |
| 8,608,505 B2 * | 12/2013 | Mantay | H01R 31/02 | 439/505 |
| 8,626,375 B2 * | 1/2014 | Miller | B60R 16/02 | 361/828 |
| 8,727,804 B2 * | 5/2014 | McNeely | A61G 7/018 | 439/502 |
| 8,878,064 B2 * | 11/2014 | Chien | H05K 1/189 | 174/117 FF |
| 8,903,597 B2 * | 12/2014 | Jones | B60R 16/023 | 701/33.1 |
| 8,977,426 B2 * | 3/2015 | Cawse | G07C 5/0808 | 701/79 |
| 9,002,572 B2 * | 4/2015 | Lipscomb | G07C 5/00 | 702/183 |
| 9,045,143 B2 * | 6/2015 | Barlsen | B60R 16/0234 | |
| 9,251,628 B2 * | 2/2016 | Ubik | G07C 5/0808 | |
| 9,287,703 B2 * | 3/2016 | Wootton | H02J 1/08 | |
| 9,444,207 B1 * | 9/2016 | Smith | H01R 27/02 | |
| 9,513,789 B2 * | 12/2016 | Marshall | G06F 3/04817 | |
| 9,531,145 B2 * | 12/2016 | Byrne | H02M 7/003 | |
| 9,538,334 B2 * | 1/2017 | Cawse | H04W 4/027 | |
| 9,581,270 B2 * | 2/2017 | Peterson | B60R 16/0207 | |
| 9,589,395 B2 * | 3/2017 | Jardine | G07C 5/0808 | |
| 9,878,683 B2 * | 1/2018 | Kang | G07C 5/008 | |
| 10,056,725 B1 * | 8/2018 | Surratt | H01R 31/06 | |
| 10,141,700 B2 * | 11/2018 | Dupuis | H01R 27/02 | |
| 10,249,414 B2 * | 4/2019 | Moran | H01B 13/01209 | |
| 10,381,878 B1 * | 8/2019 | Grundmann | H01R 27/02 | |
| 10,457,345 B2 * | 10/2019 | Herrmann | B62D 65/16 | |
| 10,965,107 B2 * | 3/2021 | Steinkamp | B60R 16/0207 | |
| 10,974,668 B2 * | 4/2021 | Murata | B60R 16/0215 | |
| D966,119 S * | 10/2022 | Karimi | D10/78 | |
| 11,544,972 B1 | 1/2023 | Koch et al. | | |
| 11,811,417 B1 * | 11/2023 | Dotu | H04L 12/40 | |
| 11,971,268 B2 * | 4/2024 | Fotak | G06Q 10/06 | |
| 12,076,478 B2 * | 9/2024 | Orphanos | A61M 3/02 | |
| 12,115,921 B1 * | 10/2024 | Saweris | H01R 27/02 | |
| 2003/0228791 A1 * | 12/2003 | Milan | H01R 31/06 | 439/502 |
| 2005/0182535 A1 * | 8/2005 | Huang | H04L 43/50 | 701/31.4 |
| 2006/0235586 A1 * | 10/2006 | Waszkowski | G07C 5/0808 | 701/31.4 |
| 2007/0146973 A1 * | 6/2007 | Leiber | B60R 16/0207 | 361/641 |
| 2008/0103652 A1 * | 5/2008 | McGee | H01R 31/065 | 701/33.2 |
| 2008/0268662 A1 * | 10/2008 | Krivtsov | H01R 27/02 | 439/34 |
| 2009/0063745 A1 * | 3/2009 | Morris | G06F 1/1632 | 710/304 |
| 2010/0010705 A1 * | 1/2010 | Duddle | G07C 5/085 | 29/854 |
| 2010/0049395 A1 * | 2/2010 | Duddle | G07C 5/008 | 29/601 |
| 2010/0185356 A1 * | 7/2010 | Haas | G07C 5/085 | 701/31.4 |
| 2011/0054732 A1 * | 3/2011 | Jardine | H01R 13/665 | 455/73 |
| 2011/0166742 A1 * | 7/2011 | Hunt | B60R 16/0207 | 701/31.4 |
| 2022/0060542 A1 | 2/2022 | Walli et al. | | |
| 2023/0262582 A1 | 8/2023 | Lizewski et al. | | |

(56) References Cited

U.S. PATENT DOCUMENTS

2024/0145989 A1\* 5/2024 Bertadillo .......... H01R 13/6272
2025/0282309 A1\* 9/2025 Walli .................. B60R 16/0234

FOREIGN PATENT DOCUMENTS

FR         3046883 A1 \* 7/2017  ........... H01R 31/005
KR    20140074533 A  \* 6/2014  ............. H01R 13/62

OTHER PUBLICATIONS

Original and Translation of CN112038845 (Year: 2020).\*
Original and Translation of CN103618182 (Year: 2014).\*
International Search Report and Written Opinion for International Application No. PCT/CA2025/050299, mailed Jun. 25, 2025, 12 pages.

\* cited by examiner

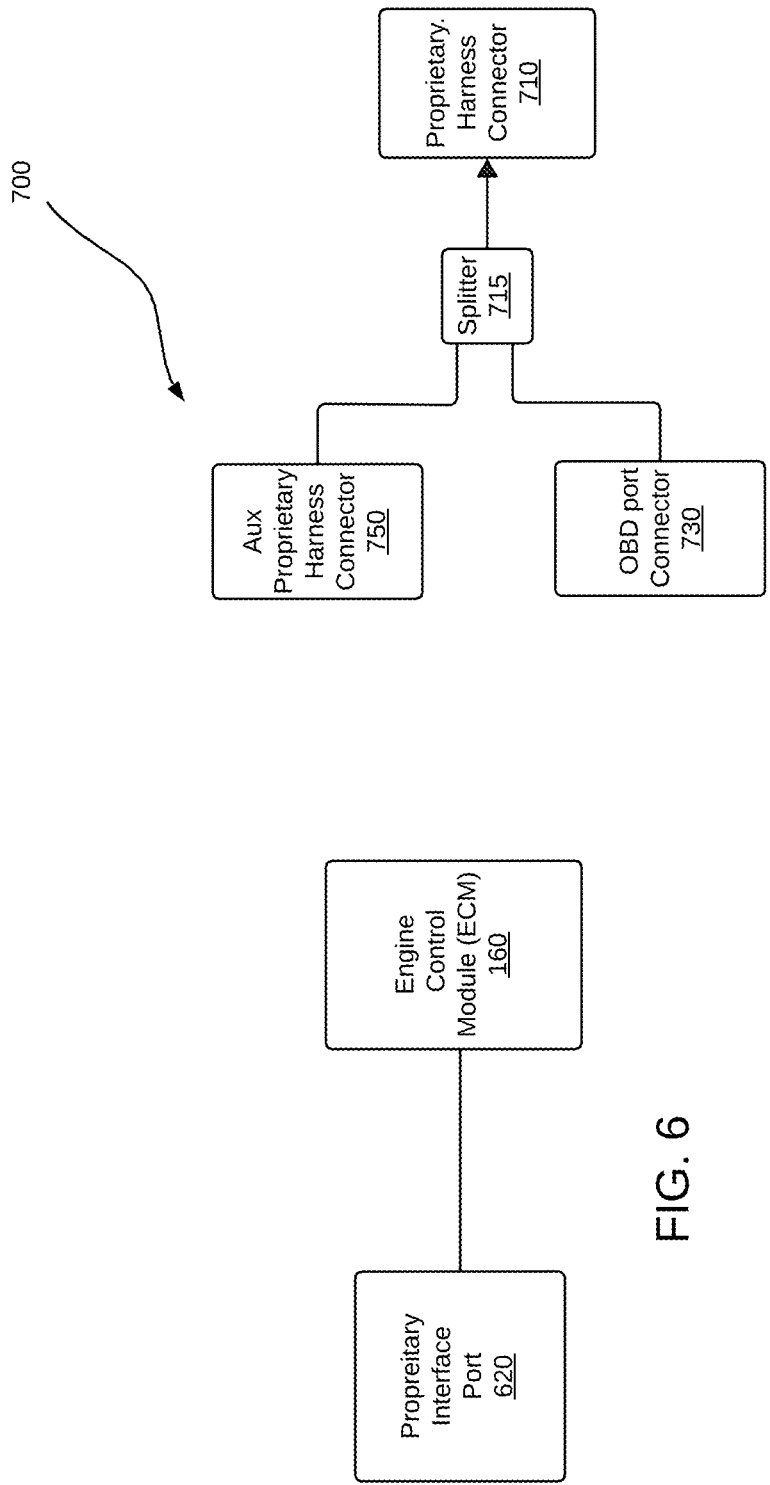

SPLITTER HARNESS FOR VEHICLES WITH A PROPRIETARY INTERFACE PORT CONNECTOR

RELATED APPLICATIONS

This application claims priority from U.S. provisional application 63/561,986 filed Mar. 6, 2024, the contents of which are herein incorporated by reference in their entirety.

FIELD

The present disclosure generally relates to vehicle telematics, and more specifically to a splitter harness for vehicles with a proprietary interface port connector.

BACKGROUND

A telematics system may gather asset data using a telematics device. The telematics device may be integrated into or located onboard the asset. The asset may be a vehicle ("vehicular asset") or some other stationary equipment. The telematics device may collect the asset data from the asset through a data connection with the asset. In the case of a vehicular asset, the telematics device gathers the asset data via an interface port, such as an on-board diagnostic port (OBD). Additionally, the telematics device may gather sensor data pertaining to the asset via sensors on the telematics device. Furthermore, the telematics device may gather location data pertaining to the asset from a location module on the telematics device. When the telematics device is coupled to the asset, the gathered sensor data and location data pertain to the asset. The gathered asset data, sensor data and location data may be received and recorded by a technical infrastructure of the telematics system, such as a telematics server, and used in the provision of fleet management tools, for telematics services, or for further data analysis.

SUMMARY

In one aspect of the present disclosure there is provided a splitter harness. The splitter harness comprises a main harness segment having a first multi-wire harness connector at a first end thereof, and a second multi-wire harness connector at a second end thereof. The splitter harness also comprises an On-Board Diagnostic (OBD) port harness segment having an OBD port connector at a first end thereof, a signal splitter for splitting a group of signal lines of the main harness segment into a first group of signal lines routed on the main harness segment to the second multi-wire harness connector and a second group of signal lines routed to a second end of the OBD port harness segment, and a power signal provider for providing a power signal from a power source to the OBD port connector. The splitter harness allows connecting a device such as a telematics device having an OBD interface to a vehicle with a proprietary interface port. The splitter harness is built using off-the-shelf parts and is therefore economical. The splitter harness provides power to the telematics device even though the proprietary interface port does not have power signal lines.

The first multi-wire harness connector may be configured for connecting to a vehicle module multi-wire connector of the vehicle module.

The second multi-wire harness connector may be configured for connecting to a proprietary interface port multi-wire connector of the proprietary interface port.

The first multi-wire harness connector may comprise a male plug and the vehicle module multi-wire connector comprises a female receptacle.

The first multi-wire harness connector may comprise a female receptacle and the vehicle module multi-wire connector comprises a male plug.

The second multi-wire harness connector may comprise a male plug and the proprietary interface port multi-wire connector comprises a female receptacle.

The second multi-wire harness connector may comprise a female receptacle and the proprietary interface port multi-wire connector comprises a male plug.

The power signal provider comprises a power signal line and a fuse tap.

The signal splitter comprises a splitter connector located on the main harness segment.

The signal splitter comprises a splitter connector which is part of the first multi-wire harness connector.

In another aspect of the present disclosure, there is provided a method of installing a splitter harness in a vehicle having a proprietary interface port connected to a vehicle module via a vehicle connector cable. The splitter harness comprises a main harness segment having a first multi-wire harness connector and a second multi-wire harness connector at both ends thereof, an On-Board Diagnostic (OBD) port harness segment having an OBD port connector at an end thereof, a signal splitter for splitting a group of signal lines on the main harness segment into a first group of signal line routed to the second multi-wire harness connector and a second group of signal lines routed to the OBD port harness segment, and a power signal provider for providing power to the OBD port connector. The method comprises unplugging the vehicle connector cable from the proprietary interface port, unplugging the vehicle connector cable from the vehicle module, connecting the first multi-wire harness connector with the vehicle module, connecting the second multi-wire harness connector with the proprietary interface port, and connecting the power signal provider with a power source.

Unplugging the vehicle connector cable from the proprietary interface port may comprise unplugging a first multi-wire vehicle cable connector of the vehicle connector cable from a proprietary interface port multi-wire connector of the proprietary interface port.

Unplugging the vehicle connector cable from the vehicle module may comprise unplugging a second multi-wire vehicle cable connector of the vehicle connector cable from a vehicle module multi-wire connector of the vehicle module.

Connecting the first multi-wire harness connector with the vehicle module may comprise connecting the first multi-wire harness connector with a vehicle module multi-wire connector of the vehicle module.

Connecting the second multi-wire harness connector with the proprietary interface port may comprise connecting the second multi-wire harness connector with a proprietary interface port multi-wire connector of the proprietary interface port.

The power signal provider may comprise a fuse tap and connecting the power signal provider with the power source may comprise inserting the fuse tap into a slot of a fuse box.

BRIEF DESCRIPTION OF THE DRAWINGS

Exemplary non-limiting embodiments of the present invention are described with reference to the accompanying drawings in which:

FIG. 6 is a simplified block diagram showing an engine control module (ECM) connected to a proprietary interface port;

FIG. 7 is a simplified block diagram of a T-harness suitable for connecting to the proprietary interface port of FIG. 6;

DETAILED DESCRIPTION

Telematics System

Figure 1:
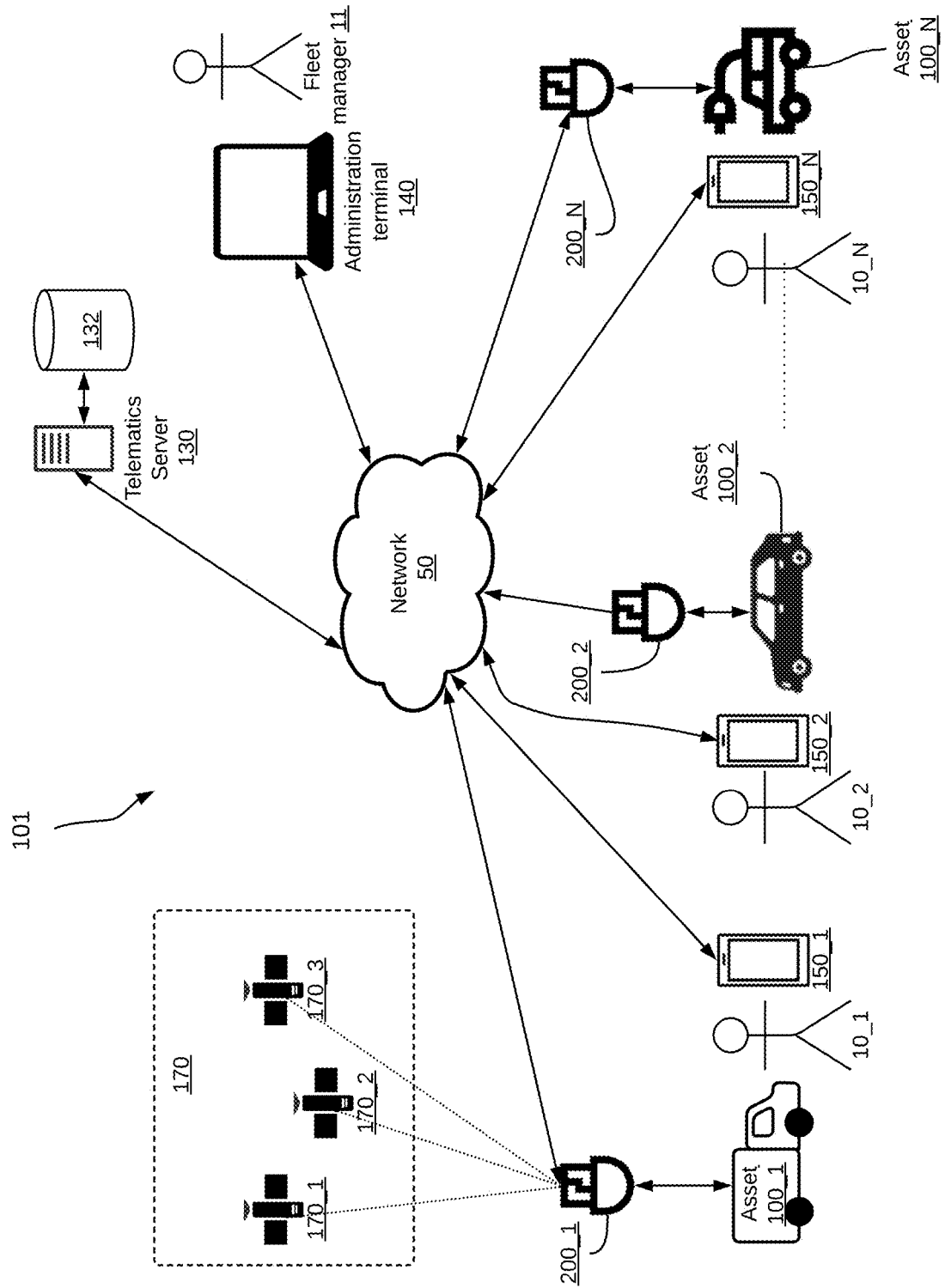
FIG. 1 is a schematic diagram of an exemplary telematics system including a plurality of telematics devices coupled to a plurality of vehicular assets.

FIG. 1 shows a high-level block diagram of a telematics system 101. The telematics system 101 includes a telematics server 130, (N) telematics devices shown as telematics device 200_1, telematics device 200_2 . . . through telematics device 200_N ("telematics device 200"), a network 50, administration terminal 140, and operator terminals 150_1, 150_2 . . . through 150_N ("the operator terminals 150"). FIG. 1 also shows a plurality of (N) assets named as asset 100_1, asset 100_2 . . . asset 100_N ("asset 100") coupled to the telematics device 200_1, telematics device 200_2 . . . telematics device 200_N, respectively. Additionally, FIG. 1 shows a plurality of satellites 170_1, 170_2 and 170_3 ("the satellites 170") in communication with the telematics devices 200 for facilitating navigation.

The assets 100 shown are in the form of vehicles. For example, the asset 100_1 is shown as a truck, which may be part of a fleet that delivers goods or provides services. The asset 100_2 is shown as a passenger car. The asset 100_N is shown as an electric vehicle (EV). Other types of vehicles, which are not shown, are also contemplated in the various embodiments of the present disclosure, including but not limited to, farming vehicles, construction vehicles, military vehicles, and the like.

While the assets shown in FIG. 1 are all land vehicles, this is not always the case. In some implementations, the asset is a marine vehicle or an airborne vehicle employing an ICE, an electric motor, or any other engine such as a jet engine, a rocket propulsion engine, and so on. In some cases, the asset is a piece of equipment such as a generator, a concrete mixer, a compressor, and the like.

The telematics devices 200 are coupled to assets 100. For example, in FIG. 1 the telematics device 200_1 is coupled to the asset 100_1. Similarly, the telematics device 200_2 is coupled to the asset 100_2 and the telematics device 200_N is coupled to the asset 100_N.

The network 50 may be a single network or a combination of networks such as a data cellular network, the Internet, and other network technologies. The network 50 provides connectivity between the different components of the system, such as between the telematics devices 200 and the telematics server 130, between the administration terminal 140 and the telematics server 130, and between the operator terminals 150 and the telematics server 130.

In some implementations of the telematics system 101, the network 50 is a cellular network utilizing cellular technology. In some implementations of the telematics system 101, the network 50 comprises a Wide Area Network (WAN) using non-cellular WAN technologies. In some implementations, the network 50 is a combination of cellular and non-cellular technologies.

The telematics server 130 is an electronic device executing machine-executable programming instructions which enable the telematics server 130 to store and analyze telematics data. The telematics server 130 may be a single computer system or a cluster of computers.

The satellites 170 are part of a global navigation satellite system (GNSS) which is a satellite-based navigation system that provides positioning, navigation, and timing services worldwide. The location information may be processed by a location module on the telematics device 200 to provide location data indicating the location of the telematics device 200 (and hence the location of the asset 100 coupled thereto).

The administration terminal 140 is an electronic device capable of connecting to the telematics server 130, over the network 50. The administration terminal 140 can be configured to retrieve data and analytics related to one or more assets 100; to receive alerts from the telematics server 130 in respect of one or more conditions on the telematics device 200; and/or to issue commands to one or more telematics device 200 via the telematics server 130. In some implementations, an administrator 11 communicates with the telematics server 130 using the administration terminal 140. In addition to retrieving data and analytics, the administration terminal 140 allows the administrator 11 to set alerts and geofences for keeping track of the assets 100, receiving notifications of deliveries, receiving notifications of vehicle conditions, and receiving alerts pertaining to driver behavior.

The operator terminals 150 are electronic devices, similar to the administration terminals 140. The operator terminals 150 are shown as smartphones, however, this is not necessarily the case. An administration terminal is any one of: a desktop computer, an industrial human-machine interface (HMI), a touch screen panel, a table, a smartphone, an Augmented Reality (AR) headset, and a Network Operations Center (NOC). The operator terminals 150 are used by operators 10 (for example, vehicle drivers) of the assets 100 to both track and configure the usage of the assets 100. For example, as shown in FIG. 1, the operator 10_1 has the operator terminal 150_1, the operator 10_2 has the operator terminal 150_2, and the operator 10_N has the operator terminal 150_N. Assuming the operators 10 all belong to a fleet of vehicles, each of the operators 10 may operate any of the assets 100. For example, FIG. 1 shows that the operator 10_1 is associated with the asset 100_1, the operator 10_2 is associated with the asset 100_2, and the operator 10_N is associated with the asset 100_N. However, any operator 10 may operate any asset 100 within a particular group of assets, such as a fleet. The operator terminals 150 are in communication with the telematics server 130 over the network 50.

In operation, a telematics device 200 is coupled to an asset 100 to capture asset data. In some implementations, the asset data is combined with location data obtained by the telematics device 200 from a location module in communication with the satellites 170 and/or sensor data gathered from sensors in the telematics device 200 or another device coupled to the telematics device 200. The combined asset data, location data, and sensor data are termed "telematics data." The telematics device 200 sends the telematics data 212 to the telematics server 130 over the network 50. The telematics server 130 processes, aggregates, and/or analyzes the telematics data 212 to generate asset information pertaining to the assets 100 or to a fleet of assets. In some implementations, the telematics server 130 stores the telematics data 212 and/or the generated asset information in the telematics database 132. In some implementations, the administration terminal 140 connects to the telematics server 130, over the network 50, to access the generated asset information. In other implementations, the telematics server 130 pushes the generated asset information to the administration terminal 140. In some implementations, the operators 10 use the operator terminals 150 to indicate to the telematics server 130 which assets 100 they are associated with. In response, the telematics server 130 updates the telematics database 132 to associate an operator 10 with an asset 100. In some implementations, the telematics server 130 provides additional analytics related to the operators 10 including work time, location, and operating parameters. For example, for vehicle assets, the telematics data 212 may include turning, speeding, and braking information. The telematics server 130 can correlate the telematics data to the vehicle's driver by querying the telematics database 132 for a particular vehicle and retrieving the associated driver information. In some implementations, an administrator 11 uses the administration terminal 140 to set alerts for certain activities pertaining to the assets 100. When criteria for an alert is met, the telematics server 130 sends a message to the administration terminal 140 to notify an administrator 11. In some implementations, the telematics server 130 sends alerts to the operator terminal 150 to notify an operator 10 of the alert. In some implementations, the telematics server 130 sends alerts to the telematics device 200 to generate an alert to the driver such as a beep, a displayed message, or an audio message.

Figure 2:
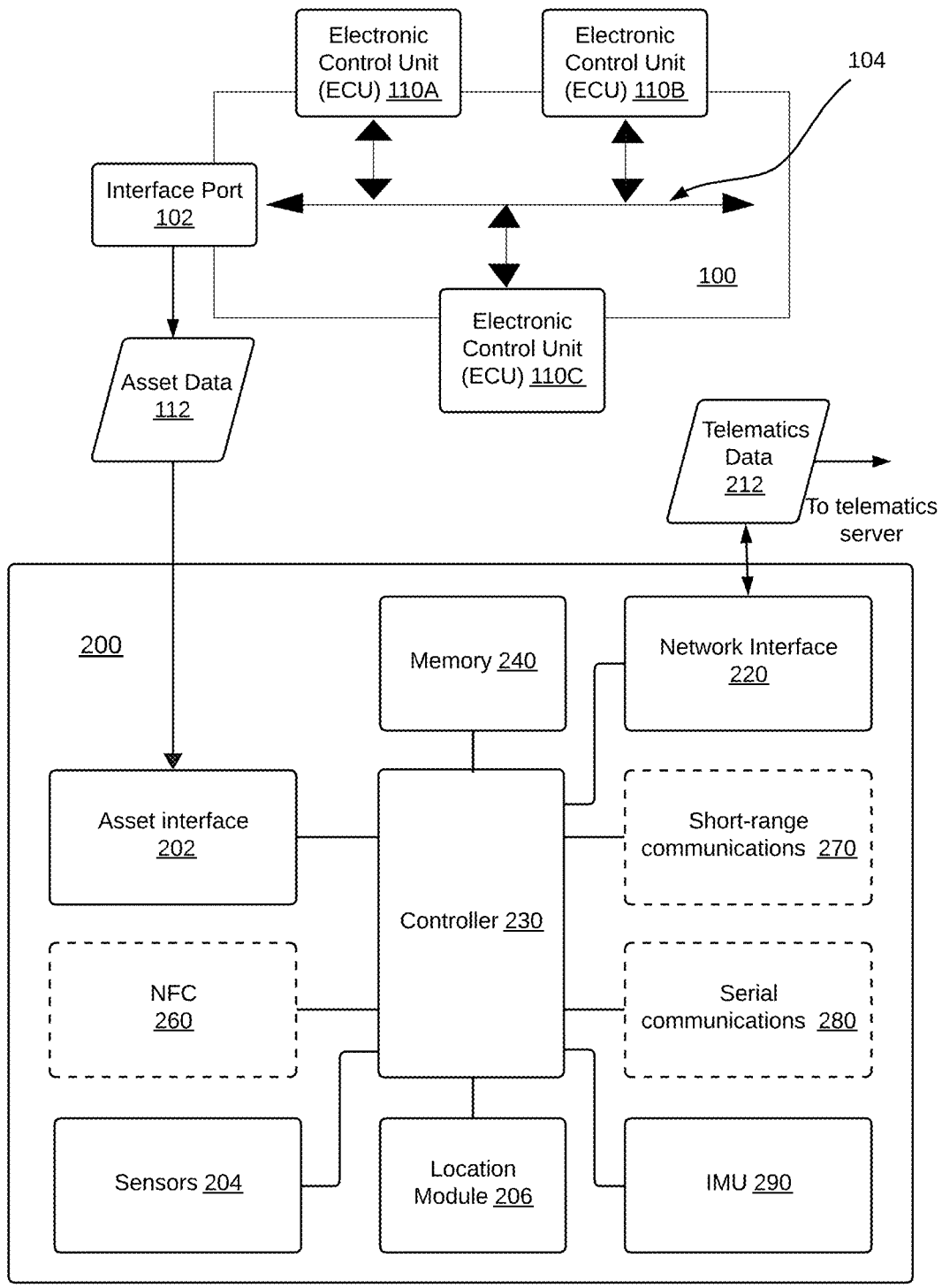
FIG. 2 is a block diagram showing a telematics device coupled to an asset's communications bus via an interface port.

The asset 100 may have a plurality of electronic control units (ECUs) of the above-mentioned types. A vehicle may, for example, have around seventy ECUs. For simplicity, only a few of the ECUs 110 are depicted in FIG. 2. For example, in the depicted embodiment the asset 100 has three ECUs shown as the ECU 110A, the ECU 110B, and the ECU 110C ("the ECUs 110"). The ECU 110A, the ECU 110B, and the ECU 110C are shown to be interconnected via an asset communications bus.

The most commonly used type of asset communications bus is the Controller Area Network (CAN) bus. CAN is a robust and standardized communication protocol designed for real-time control applications. The CAN bus is a physical bus used to connect various ECUs and sensors, allowing them to exchange data and commands. CAN ensures that different vehicle systems can work together seamlessly. ECUs are connected to the CAN bus using dedicated CAN transceivers and connectors.

For example, in FIG. 2 the ECUs 110 are interconnected using the CAN bus 104. The ECUs 110 send and receive information to one another in CAN data frames by placing the information on the CAN bus 104. When an ECU 110 places information on the CAN bus 104, other ECUs 110 receive the information and may or may not consume or use that information.

Different protocols may be used to exchange information between the ECUs over a CAN bus. For example, ECUs 110 in trucks and heavy vehicles use the Society of Automotive Engineering (SAE) J1939 protocol to exchange information over a CAN bus 104. J1939 is based on CAN and is used for diagnostic and communication purposes. Most passenger vehicles use the SAE J1979 protocol, which is commonly known as On-Board Diagnostic II (OBD-II) protocol to exchange information between ECUs 110 on their CAN bus 104. OBD-II is a standardized diagnostic protocol used in most vehicles manufactured since the late 1990s. OBD-II provides a common interface for diagnostic tools to communicate with a wide range of ECUs in the vehicle, including the engine control module (ECM), transmission control module (TCM), and more. OBD-II allows for reading diagnostic trouble codes (DTCs), live data, and performing various diagnostic tests.

An asset 100 may allow access to information exchanged over the CAN bus 104 via an interface port 102. For example, if the asset 100 is a passenger car, then the interface port 102 is most likely an OBD-II port ("OBD port"). Data accessible through the interface port 102 is termed the asset data 112. In some implementations, the interface port 102 includes a power interface for providing electric power to a telematics device 200 connected thereto.

Telematics Device

Further details relating to the telematics device 200 and how it interfaces with an asset 100 are shown with reference to FIG. 2. FIG. 2 depicts an asset 100 and a telematics device 200 coupled thereto. Selected relevant components of each of the asset 100 and the telematics device 200 are shown.

The telematics device 200 includes a controller 230 coupled to a memory 240, an asset interface 202 and a network interface 220. The telematics device 200 also includes one or more sensors 204 and a location module 206. In some implementations, the telematics device 200 contains an inertial measurement unit, shown as the IMU 290. The telematics device 200 may also contain some optional components, shown in dashed lines in FIG. 2. For example, the telematics device 200 may contain one or more of: a near-field communications (NFC) module such as NFC module 260, a short-range wireless communications module 270, and a wired communications module such as a serial communications module 280. In some embodiments (not shown), the telematics device 200 may have a dedicated power source or a battery. In other embodiments, the telematics device 200 may receive power directly from the asset 100, via the interface port 102. The telematics device 200 shown is an example. Some of the components shown in solid lines may also be optional and may be implemented in separate modules. For example, some telematics devices (not shown) may not have a location module 206 and may rely on an external location module for obtaining the location data. Some telematics devices may not have any sensors 204 and may rely on external sensors for obtaining sensor data.

Interface Port

Figure 3:
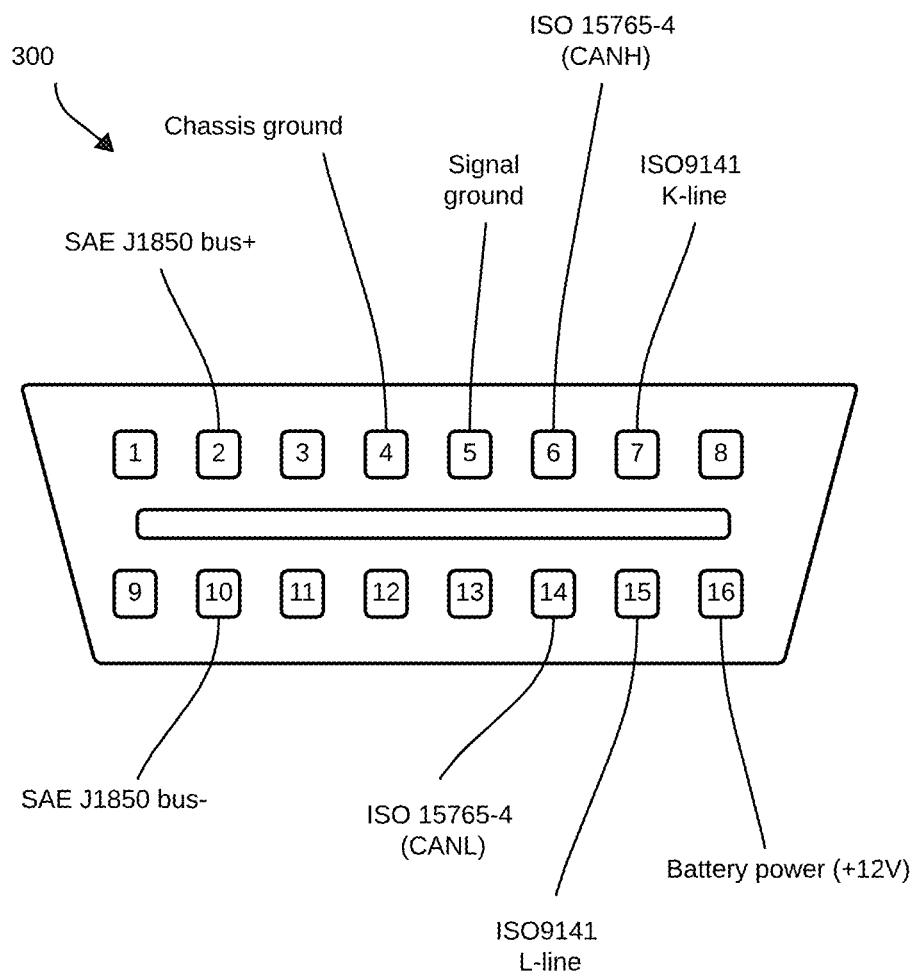
FIG. 3 depicts the pinout of a J1962 port connector, also known as an On Board Diagnostics (OBD) port connector.

FIG. 3 depicts the pinout of a vehicle J1962 16-pin connector, also referred to as an OBD port connector 300. As shown in FIG. 3, the OBD port connector 300 has different signal lines which may be used by different protocols. Signal line 1 is known as the SAE J1850 bus+ ("J1850+) signal line and signal line 2 is known as the SAE J1850 bus-("J1850-) signal. Signal line 4 is the chassis ground. Signal line 5 is the signal ground. The J1850+/J1850-signal lines are used by the Variable Pulse Width (VPW) protocol and the Pulse Width Modulation (PWM) protocol. Signal line 7 is known as the ISO9141 K-line ("K-line") signal line while signal line 15 is known as the ISO9141 L-line ("L-line') signal line. The K-line and L-line are used by the ISO9141 protocol and the ISO14230 protocol. Signal line 6 is the ISO 15765-4 CAN High ("CANH") signal line while signal line 14 is the ISO 15765-4 CAN Low ("CANL") signal line. The CANH and CANL signal lines are used by the CAN protocol. Signal line 16 is the battery power (+12V).

Figure 4:
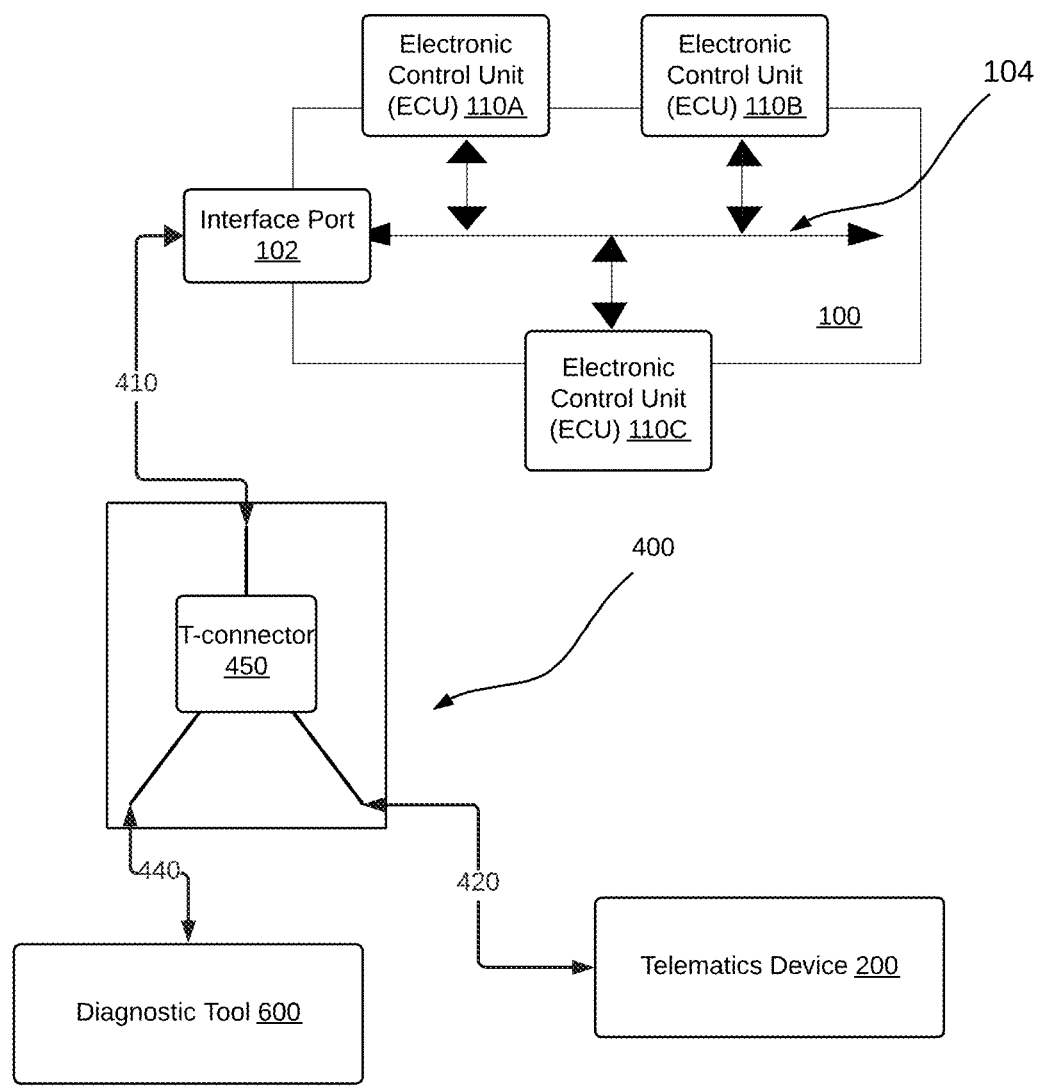
FIG. 4 depicts a telematics device and a diagnostic tool both connected to an asset's communications bus via a T-Harness.

In addition to having a telematics device 200 connected therewith, it may also be desired to connect a diagnostic tool such as an OBD reader or an emissions testing device to the vehicle asset. Since a vehicle may only have one interface port (e.g., OBD port), a splitting device needs to be used. FIG. 4 depicts the asset 100 of FIG. 2 shown connected to both a telematics device 200 and a diagnostic tool 600 via a splitter harness. As an example of a splitter harness, a T-harness 400 that splits a group of signals into two groups of signals is shown.

In this disclosure a "diagnostic tool" is an electronic device that may be used to read asset data 112 for the purpose of diagnosing problems, for the purpose of conducting performance testing such as emission testing, or for the purpose of ECU programming and/or firmware update. A diagnostic tool may also clear some engine error codes, typically known as Diagnostic Trouble Codes (DTCs). A diagnostic tool may also be referred to as a "scan tool" or a "testing tool".

A wire harness is a specially designed system that keeps numerous wires organized. In this disclosure, a "splitter harness" refers to a harness device that splits a group of signals into multiple groups of signals. As a non-limiting embodiment, a "T-harness" splits a group of signals into two groups of signals thus allowing two electrical devices to connect to the same interface. In the context of a vehicle a splitter harness can be used to connect multiple devices to the interface port 102 of a vehicle. A T-harness can be used to connect two devices to the interface port (e.g. the OBD port) of a vehicle. Logically, a splitter harness consists of a splitter connector and a plurality of cables or harness segments each ending in a connector for interfacing to a device. The splitter connector depicted in FIG. 4 comprises a T-connector 450, a first harness segment 410, a second harness segment 420, and a third harness segment 440. The T-connector 450 splits the group of signals provided by the interface port 102 over the first harness segment 410, such as the signals of the OBD port connector 300, into two groups of signals each sent over the second harness segment 420 and the third harness segment 440. For example, a telematics device 200 may connect to the second harness segment 420 and a diagnostic tool 600 may connect to the third harness segment 440. Accordingly, both the telematics device 200 and the diagnostic tool 600 have access to the interface port 102 and the CAN bus 104.

Figure 5:
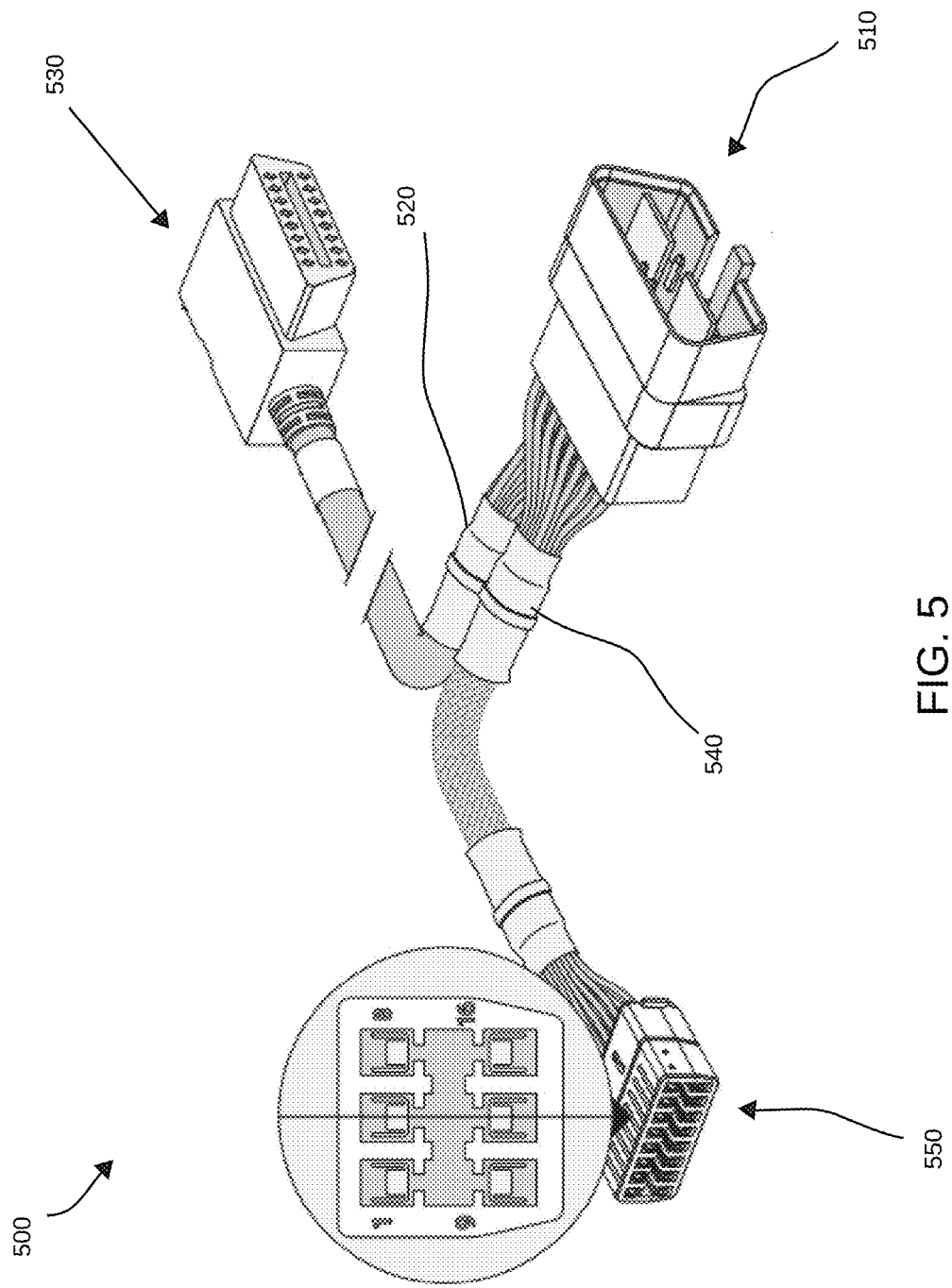
FIG. 5 is a perspective view of an exemplary T-Harness for use with an OBD (J1962) port connector.

FIG. 5 depicts a T-harness 500 for connecting to a vehicle with an OBD port and having a standard OBD (J1962) 16-wire connector. The T-harness 500 has a vehicle OBD harness connector 510, a telematics device harness segment 520, a telematics device OBD port connector 530, an auxiliary OBD harness segment 540, and an auxiliary OBD harness connector 550.

The vehicle OBD harness connector 510 connects the T-harness 500 to the vehicle's own OBD connector. The vehicle OBD harness connector 510 also serves as a splitter connector (in this case a T-connector) which splits the group of signals of the vehicle OBD harness connector 510 into two identical groups of signals. A first group of signals goes into the telematics device harness segment 520, and a second group of signals goes into the auxiliary OBD harness segment 540. In other words, every signal of the OBD port is replicated in each of the telematics device harness segment 520 and the auxiliary OBD harness segment 540.

The telematics device OBD port connector 530 is shaped for receiving a device with a mating OBD connector such as a telematics device 200. The telematics device OBD port connector 530 is connected to the telematics device harness segment 520.

The auxiliary OBD harness connector 550 is intended to replace the vehicle's OBD connector. The auxiliary OBD harness connector 550 is connected to the auxiliary OBD harness segment 540.

In a typical arrangement, the T-harness 500 is installed in a vehicle to replace the vehicle's OBD port and yet provide an additional OBD port for connecting a telematics device thereto. To install the T-harness 500 in a vehicle, the vehicle's own OBD port is removed from the vehicle mount, and connected to the vehicle OBD harness connector 510. The auxiliary OBD harness connector 550 is connected to the vehicle mount to replace the vehicle's OBD connector. The auxiliary OBD harness connector 550 may need an adapter to allow it to fit to the vehicle mount. By connecting the auxiliary OBD harness connector 550 to the vehicle mount, the vehicle complies with some regulations such as the California Air Resources Board (CARB) which mandates that the location of a vehicle's OBD port is not changed. The auxiliary OBD harness connector 550 then allows any OBD devices to connect to the vehicle's asset communications bus for example to conduct emissions testing.

Finally, a telematics device 200 may connect to the telematics device OBD port connector 530. It should be noted that any other device that has a standard OBD connector J1962 may connect to the telematics device OBD port connector 530. Advantageously, the vehicle still provides an OBD port at the same location as the original OBD port thereof, while at the same time also allowing a telematics device 200 to connect to the asset communications bus and capture telematics data.

Proprietary Interface Ports

Vehicles manufactured prior to 1996 may have proprietary interface ports having a proprietary interface port connector, instead of the standard J1962 OBD connector. Some of such vehicles do not have many instances of the ECU 110, connected by a CAN bus. Instead many such vehicles have a vehicle module such as an engine control module (ECM) connected with the proprietary interface port. Such an arrangement is depicted in FIG. 6. In FIG. 6, the ECM 160 is connected to a proprietary interface port 620.

Modern telematics devices are designed to fit into an OBD port connector based on the J1962 standard, such as the OBD port connector 300 of FIG. 3. A telematics device 200 having an OBD interface connector configured to mate with the OBD port connector 300 cannot connect directly to a proprietary interface port connector having a different shape from the OBD port connector 300. Furthermore, if it is desired to connect a telematics device to an older vehicle (pre-1996) while having the proprietary interface port available for other devices to connect thereto, then a proprietary T-harness needs to be made. The proprietary T-harness can facilitate making the proprietary interface port available (e.g., for connectivity with a proprietary diagnostic tool) while also allowing the connection of a telematics device that has an OBD interface connector. A simplified block diagram of a proprietary T-harness for connecting to a proprietary interface port is shown in FIG. 7. The proprietary T-harness 700 contains a proprietary harness connector 710, a T-connector 715, an auxiliary proprietary harness connector 750, and an OBD port connector 730. The various connectors are connected by harness segments as shown.

The proprietary harness connector 710 is a proprietary connector having the opposite gender of the proprietary interface port connector and is therefore designed to mate therewith. The T-connector 715 splits the group of signals from the proprietary harness connector 710 into two groups of signals. In other implementations, the T-connector 715 is not a separate component. Instead, the proprietary harness connector 710 may contain a T-connector for splitting the signals of the proprietary interface port 620 into two groups of signals for routing to the auxiliary proprietary harness connector 750, and the OBD port connector 730. The auxiliary proprietary harness connector 750 is similar to the proprietary interface port connector. The OBD port connector 730 is similar to the aforementioned telematics device OBD port connector 530.

While the proprietary T-harness 700 would work, the proprietary T-harness 700 requires tooling two proprietary connectors of opposite genders, namely the proprietary harness connector 710 and the auxiliary proprietary harness connector 750. The tooling of two proprietary connectors is costly and time consuming.

Another limitation of the proprietary T-harness 700 is that it may not provide power to the OBD port connector 730, which is a requirement for OBD ports. For example, a telematics device connected to the OBD port connector 730 will not work if the proprietary interface port 620 does not provide any power signals to the proprietary T-harness 700 via the proprietary harness connector 710.

Figure 8A:
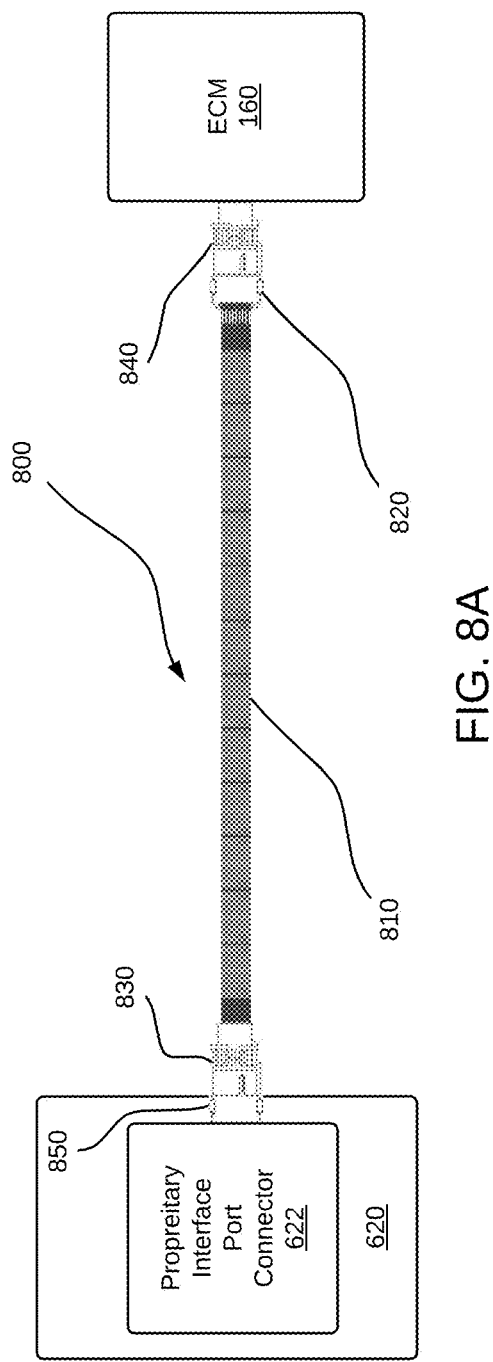
FIG. 8A is a block diagram showing an ECM, a proprietary interface port, and a vehicle connector cable therebetween.
Figure 8B:
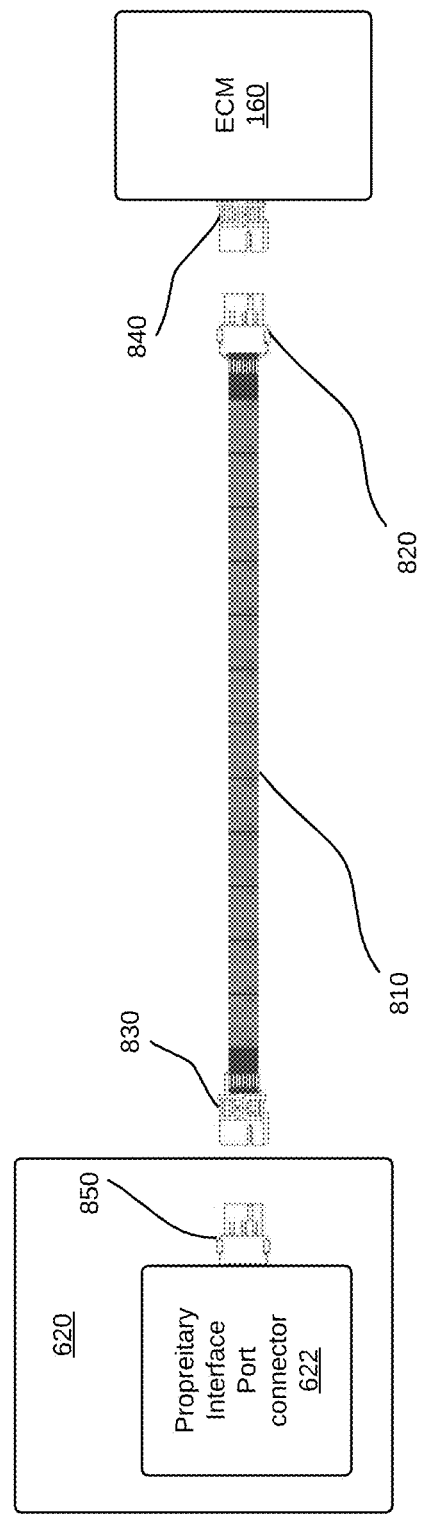
FIG. 8B is a block diagram of the ECM, the proprietary interface port, and the vehicle connector cable of FIG. 8A with the vehicle connector cable disconnected from the ECM and the proprietary interface port.

In some vehicles, a vehicle module such as the ECM 160 is connected with the proprietary interface port 620 by a vehicle connector cable 800. FIG. 8A and FIG. 8B show such an arrangement. A vehicle module can have a vehicle module multi-wire connector for connecting the vehicle module to the proprietary interface port, for example by a cable. For example, the ECM 160 has a vehicle module multi-wire connector in the form of a male plug 840. The proprietary interface port 620 has a proprietary interface port connector 622 for connecting devices to the vehicle, and a proprietary multi-wire connector in the form of a female receptacle 850 for connecting the proprietary interface port. A vehicle connector cable has a first multi-wire vehicle cable connector at a first end, a second multi-wire vehicle cable connector at a second end, and conduit in which signal lines run between the first multi-wire connector and the second multi-wire connector. As an example, the vehicle connector cable 800 has a conduit 810 in which the signal lines are running between a male plug 830 at one end and a female receptacle 820 at the other end. The male plug 830 is configured to mate with the female receptacle 850 of the proprietary interface port 620. Similarly, the male plug 840 is configured to mate with the female receptacle 820 of the ECM 160. When the male plug 830 is mated with the female receptacle 850, and the male plug 840 is mated with the female receptacle 820, electrical connectivity is established between the ECM 160 and the proprietary interface port 620.

Figure 9:
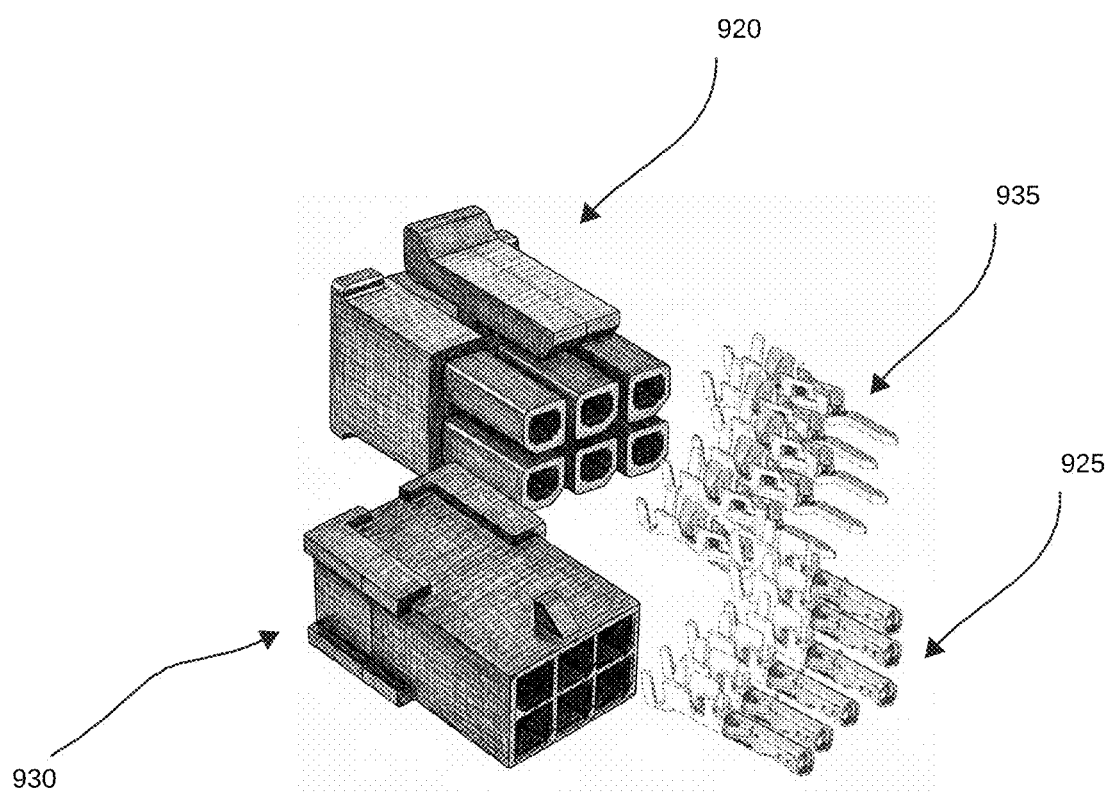
FIG. 9 depicts a receptacle connector, a plug connector, male sockets, and female sockets.

The male plug 830, the male plug 840, the female receptacle 820, and the female receptacle 850 are off-the-shelf connectors such as the Molex™ Micro-Fit 3.0 series shown in FIG. 9. A 6-pin male plug 920 can receive 6 female sockets 925. A 6-pin female receptacle 930 receives 6 male sockets 935. The 6-pin male plug 920 can mate with the 6-pin female receptacle 930 to establish electrical connectivity.

The inventors have come up with a splitter harness for providing connectivity between a vehicle module and a proprietary interface port. The vehicle module has a vehicle module multi-wire connector and the proprietary interface port has a proprietary interface port multi-wire connector. The splitter harness is comprised of a main harness segment, an OBD port harness segment, a signal splitter, and a power signal provider. The main harness segment has a first multi-wire harness connector at a first end thereof and a second multi-wire harness connector at a second end thereof. The OBD port harness segment has an OBD port connector at a first end thereof. The signal splitter is a device that splits a group of signal lines of the main harness segment into a first group of signal lines routed on the main harness segment to the second multi-wire harness connector, and a second group of signal lines routed to a second end of the OBD port harness segment. The splitter harness connects a proprietary interface port to a vehicle module and provides an OBD port connector for connecting a device such as a telematics device. The power signal provider provides a power signal to the OBD port connector. As an example, a T-harness connecting an ECM to a proprietary interface port will be discussed below. In this implementation, the ECM represents a vehicle module.

Figure 10:
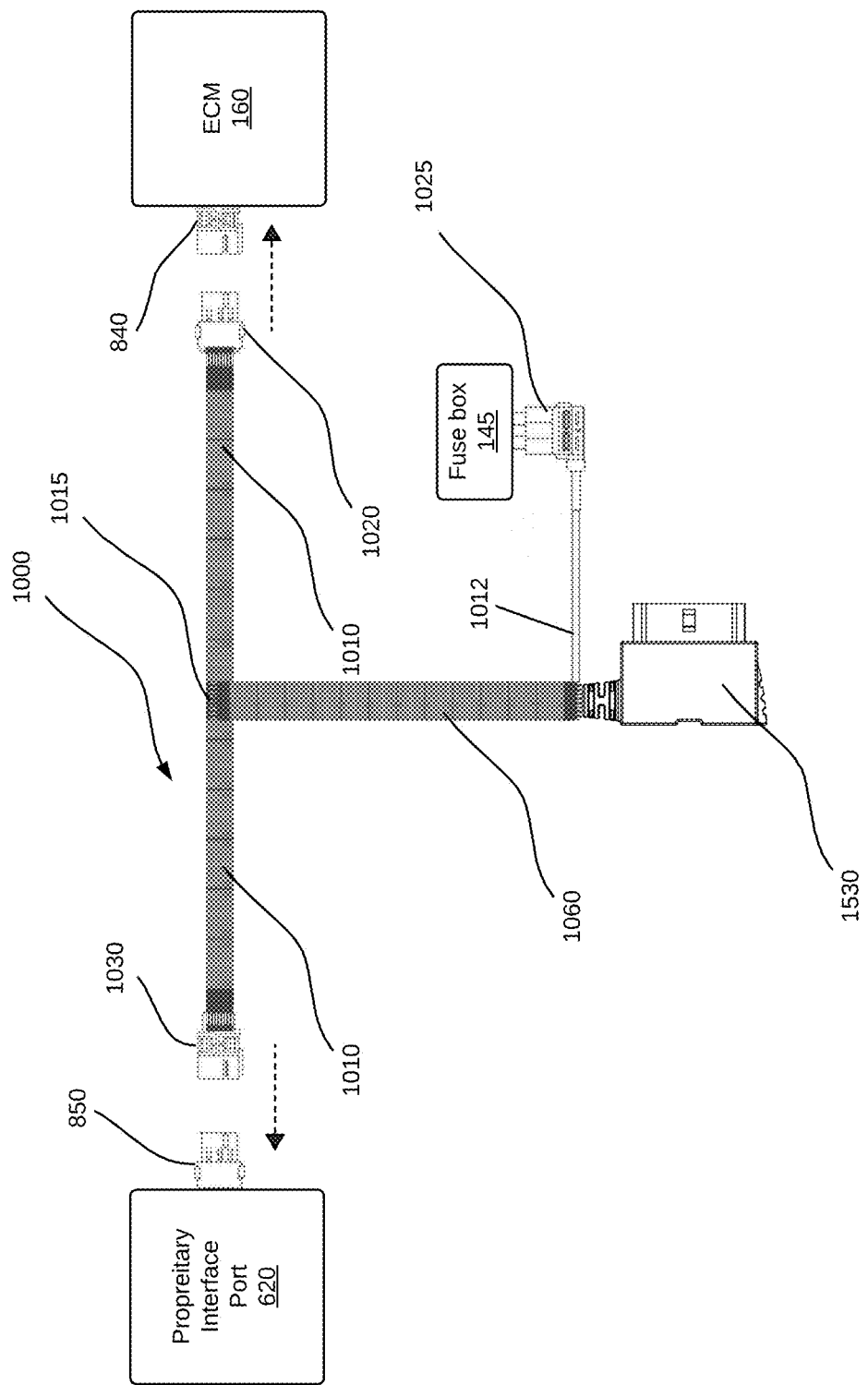
FIG. 10 depicts a T-harness for installation between an ECM and a proprietary interface port, in accordance with embodiments of the present disclosure.

FIG. 10 depicts an exemplary implementation of a splitter harness in the form of a T-harness 1000, shown FIG. 10. The T-harness 1000 can provide connectivity between the ECM 160 and the proprietary interface port 620, provide OBD signals at an OBD port connector 1530, and provide power to the OBD port connector 1530.

The T-harness 1000 has a main harness segment 1010 having a first multi-wire harness connector in the form of a male plug 1030 at one end thereof and a second multi-wire harness connector in the form of a female receptacle 1020 at the opposite end thereof. The male plug 1030 and the female receptacle 1020 are off-the-shelf components similar to the ones depicted in FIG. 9. The main harness segment 1010 also has a signal splitter 1015. The OBD port harness segment 1060 is connected at one end thereof to the signal splitter 1015 and is connected at another end thereof to an OBD port connector 1530. A power signal line 1012 connects a fuse tap 1025 to the OBD port connector 1530.

The main harness segment 1010 contains a group of signal lines running between the male plug 1030 and the female receptacle 1020.

The male plug 1030 and the female receptacle 1020 are multi-wire harness connectors similar to the 6-pin male plug 920 and the 6-pin female receptacle 930 of FIG. 9, respectively. The male plug 1030 and the female receptacle 1020 may, however, have any number of pins based on the number of signal lines between an engine control module and a proprietary interface port.

The signal splitter 1015 is a device that splits the group of signal lines from the female receptacle 1020 into two groups of signals, routes a first group of signals on the main harness segment to the male plug 1030, and routes a second group of signal lines to the OBD port harness segment 1060. The signal splitter 1015 may be a T-connector or a Y-connector.

The OBD port harness segment 1060 routes the second group of signal lines from the main harness segment 1010 to the OBD port connector 1530. The OBD port connector 1530 is similar to the telematics device OBD port connector 530.

The power signal provider of the T-harness 1000 is in the form of a fuse tap 1025. The fuse tap 1025 is an off-the-shelf component that connects to a fuse circuit in a fuse box 145 of a vehicle, and provides a power signal that is transmitted over the power signal line 1012 to the OBD port harness segment 1060. The fuse tap 1025 typically has two slots for connecting two fuses; one fuse controls the power signal that is transmitted over the power signal line 1012 and another fuse for controlling the original circuit that the fuse circuit represents (if applicable)

FIGS. 12-16 are engineering drawings of the T-harness 1000, in accordance with embodiments of the present disclosure.

Figure 12:
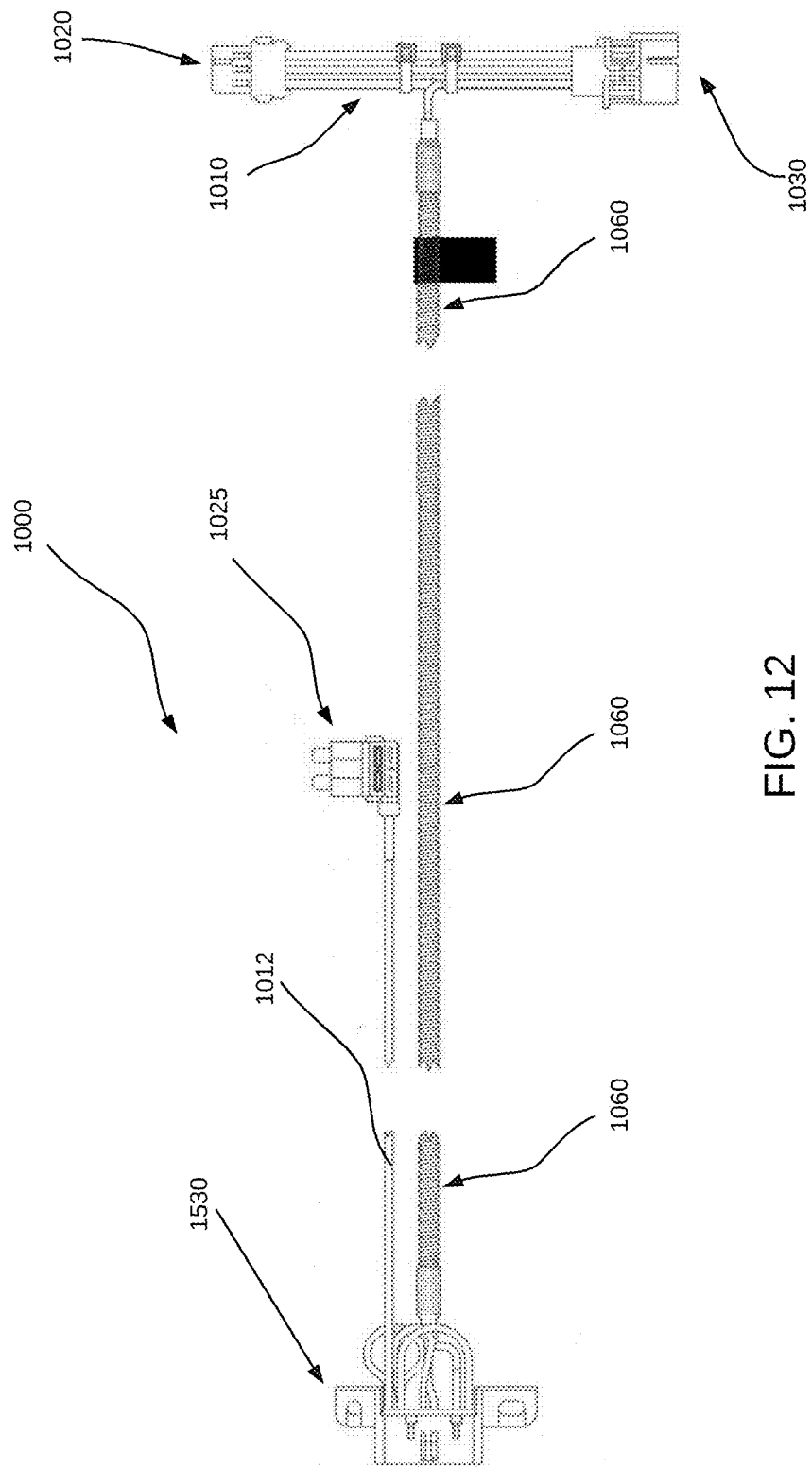
FIG. 12 is a front view schematic of a splitter harness for connecting a vehicle module with a proprietary interface port, in accordance with embodiments of the present disclosure.

FIG. 12 depicts the T-harness 1000 in a front view thereof.

Figure 13:
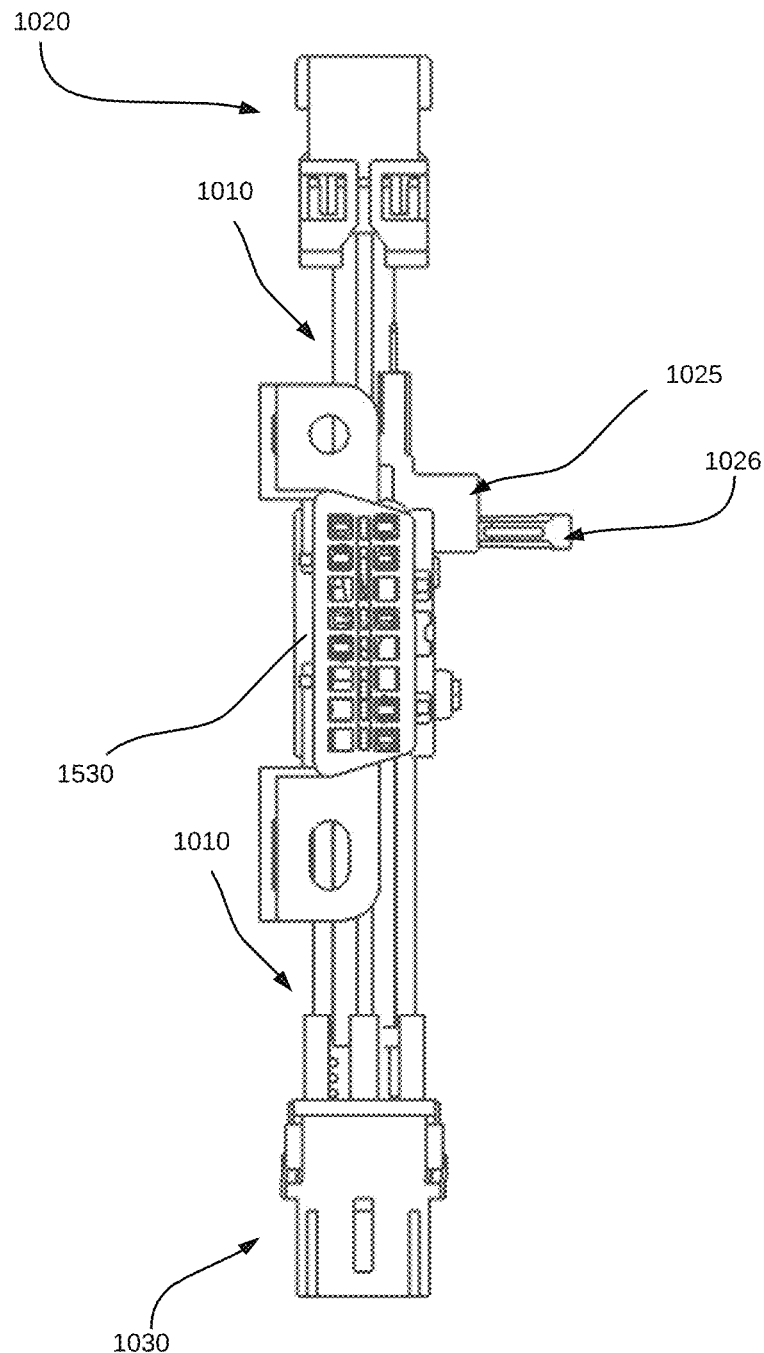
FIG. 13 is a side view schematic of the splitter harness of FIG. 12.

FIG. 13 is a side view taken from the side of the OBD port connector 1530. FIG. 13 shows a fuse 1026 connected to the fuse tap 1025 for enabling the power signal to be routed to the OBD port connector 1530.

Figure 14:
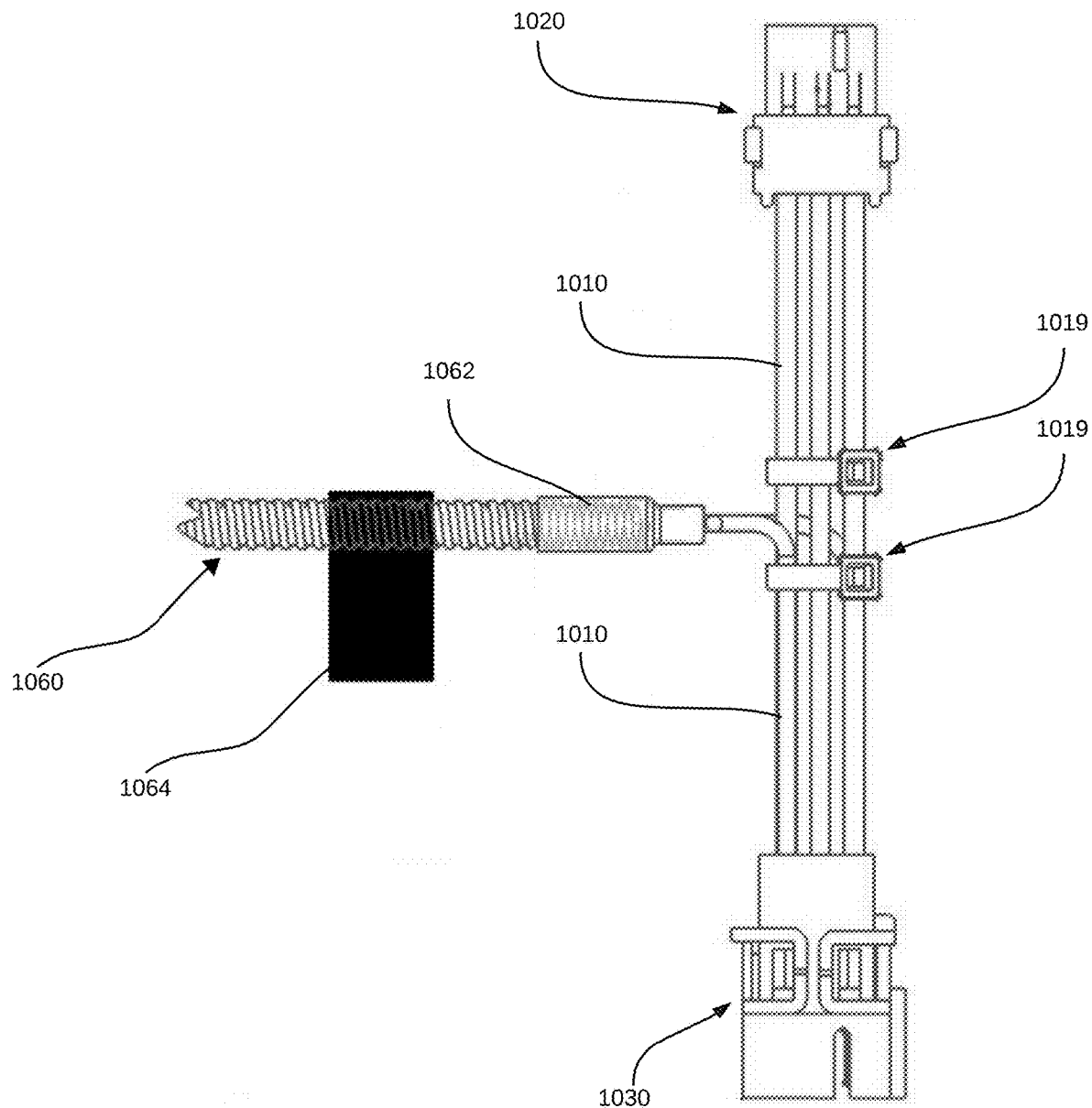
FIG. 14 is a front view schematic of a main harness segment, splitter connector, and a portion of the OBD port harness segment of the splitter harness of FIG. 12.

FIG. 14 is a front view focusing on the main harness segment 1010, the male plug 1030 and the female receptacle 1020. The main harness segment 1010 is comprised of a plurality of signal lines bundled together by cable ties 1019. The main harness segment 1010 has a T connection from which signal lines are directed to become the OBD port harness segment 1060. The signal lines are routed inside a conduit having a heat shrink 1062 at ends thereof. A label 1064 may optionally be connected to the conduit and include relevant information about the T-harness 1000.

Figure 15:
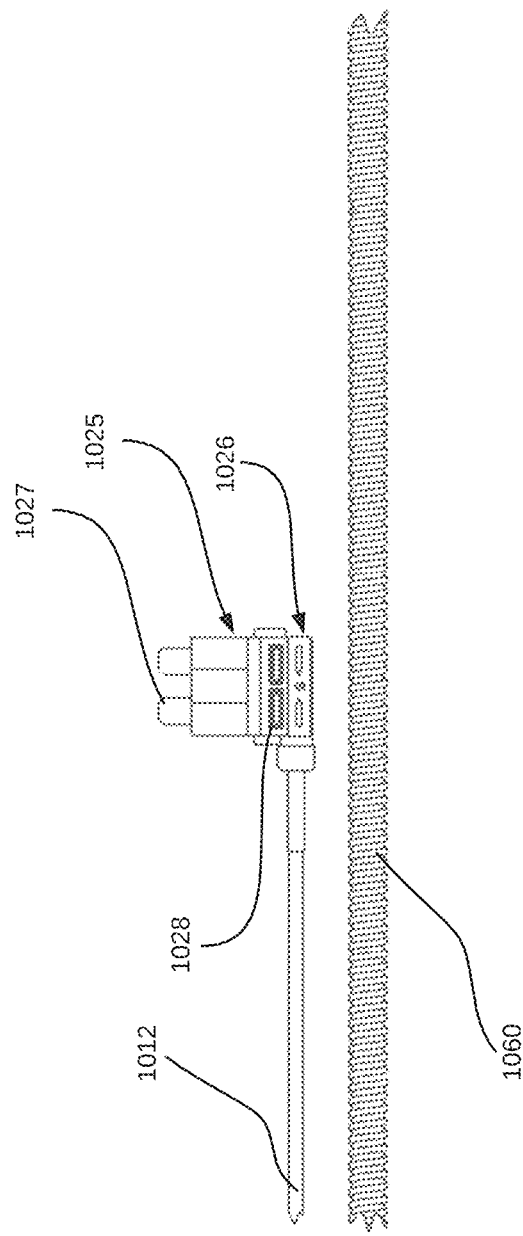
FIG. 15 is a front view schematic of a portion of the splitter harness of FIG. 12 including the OBD port harness segment and a power signal provider in the form of a fuse tap and power signal line.

FIG. 15 is a front view focusing on a central portion of the T-harness 1000. A portion of the OBD port harness segment 1060 is shown. Furthermore, the fuse tap 1025 is shown in more detail. The fuse tap 1025 has two leads 1027 for insertion into a fuse slot in a fuse box. The fuse tap 1025 provides a power signal line 1012 and two fuse slots. In FIG. 15 one fuse slot contains a fuse 1026 which connects power from the leads 1027 to the power signal line 1012. The second fuse slot 1028 is available. If the fuse slot of the fuse box had an original fuse, that original fuse may be inserted in the second fuse slot 1028.

Figure 16:
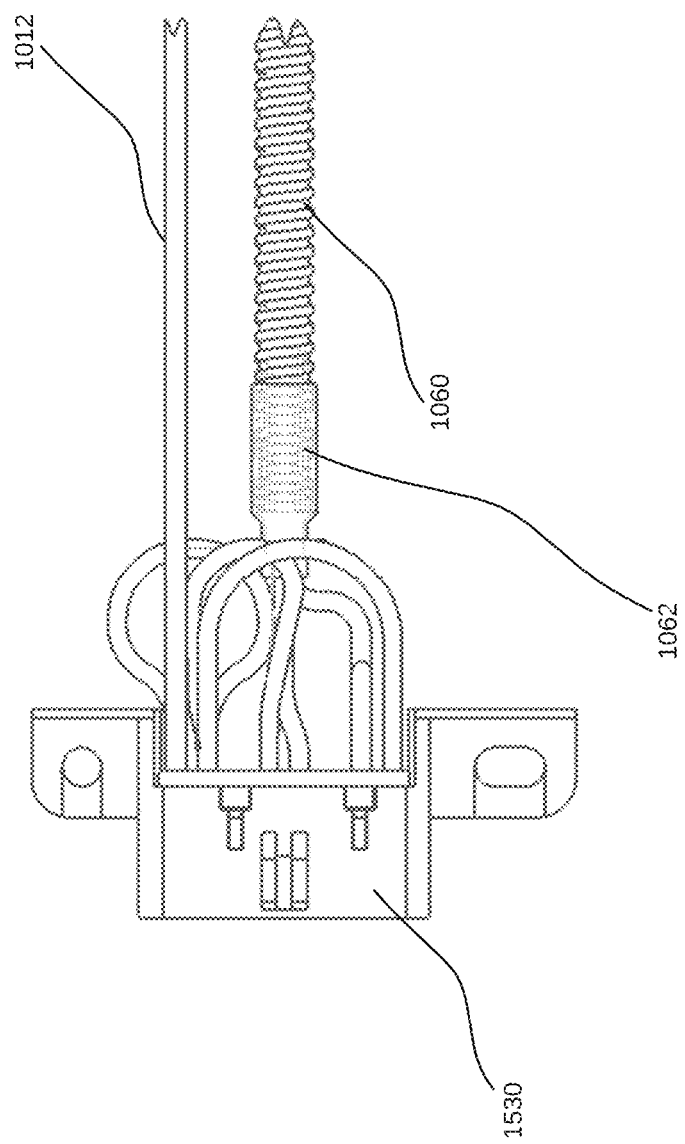
FIG. 16 is a front view schematic showing a portion of an OBD port harness segment of the splitter harness of FIG. 12 including an OBD port connector and the power signal line providing a power signal to the OBD port connector.

FIG. 16 is a front view focusing on the OBD port connector end of the T-harness 1000 and shows the signal lines from the OBD port harness segment 1060 connected to the OBD port connector 1530. FIG. 16 also shows the conduit and the heat shrink 1062. The power signal line 1012 from the fuse tap 1025 is also shown connected to the OBD port connector 1530 for providing power to pin 16 (as shown in FIG. 3, pin 16 is the power pin).

To install the T-harness 1000, first the vehicle connector cable 800 is disconnected at both ends from the ECM 160 and the proprietary interface port 620. Specifically, as shown in FIG. 8, the male plug 830 is unplugged from the female receptacle 850 and the male plug 840 is unplugged from the female receptacle 820.

Next, the female receptacle 1020 of the T-harness 1000 is connected to the male plug 840 of the ECM 160.

Next, the male plug 1030 of the T-harness 1000 is plugged into the female receptacle 850 of the proprietary interface port 620.

Next, the fuse tap 1025 is inserted in an available fuse slot in the fuse box 145. Typically a fuse tap 1025 allows for the connection of another fuse thereto. Accordingly a fuse of the appropriate rating may be removed from the slot thereof and inserted into the fuse tap 1025. Additionally, a fuse 1026 is inserted into the fuse tap for routing the power signal to the power signal line, then the fuse tap 1025 is inserted into the use slot in the fuse box 145.

Figure 11:
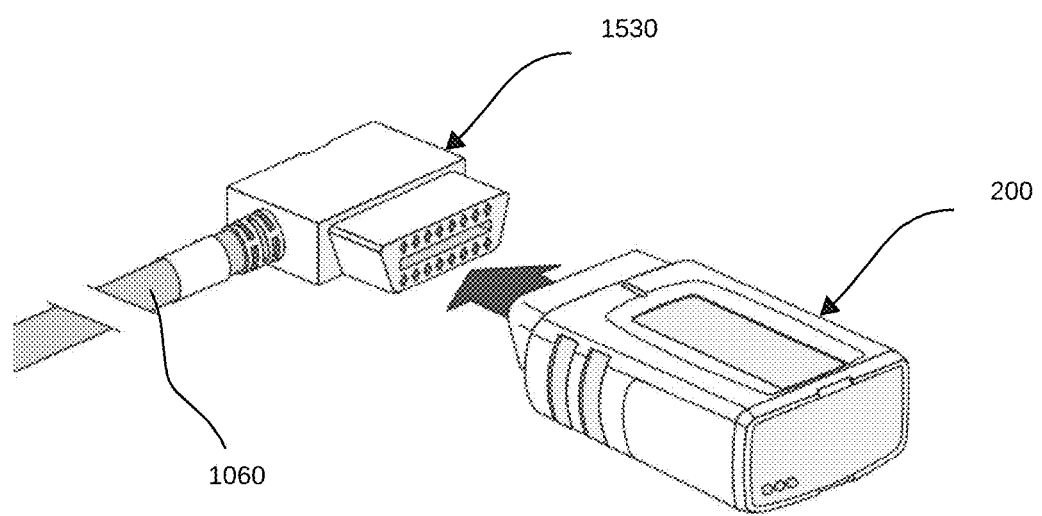
FIG. 11 is a perspective view depicting the insertion of a telematics device OBD interface connector into an OBD port connector end of the T-harness of FIG. 10.

Lastly, a telematics device or any diagnostic device that has an OBD connector may be plugged into the OBD port connector 1530, as shown in FIG. 11.

Advantageously, the provided T-harness 1000 allows the connection of a diagnostic tool or a telematics device having an OBD connector, to a vehicle that has a proprietary interface port 620. Additionally, the T-harness provides power to the diagnostic tool or telematics device if needed by using a fuse tap that is part of the T-harness 1000. The provided T-harness 1000 only contains off-the-shelf components and is therefore inexpensive to manufacture. Another advantage of using the T-harness 1000 is that on older vehicles the pins of the proprietary interface port connector 622 may have poor conductivity that impacts signal quality. Connecting a telematics device to the pins of the proprietary interface port connector 622 may lead to poor capturing of the vehicle data by the telematics device 200. The T-harness 1000, however, connects to the ECM directly and is therefore unaffected by the age and/or condition of the proprietary interface port connector 622.

While the T-harness 1000 uses a female receptacle 1020 at the end which connects to the ECM 160 and a male plug 1030 at the end which connects to the proprietary interface port 620, this is not necessarily the case. In some embodiments, the situation may be reversed, both ends may have male plugs, or both ends may have female receptacles. This will all depend on the type of multi-wire connectors used by the ECM 160 and the proprietary interface port 620.

The proprietary interface port 620 is shown to have proprietary interface port multi-wire connector (in the form of the female receptacle 850) directly connected to the proprietary interface port connector 622. However, this is not necessarily the case, and the female receptacle 850 may connect to the proprietary interface port connector 622 via a cable.

The signal splitter 1015 is shown located on the main harness segment 1010 halfway between the male plug 1030 and the female receptacle 1020. However, it is also possible that a splitting female receptacle is used instead of the female receptacle 1020, the splitting female receptacle splitting the signals into the main harness segment 1010 and the OBD port harness segment 1060.

The T-harness 1000 may obtain power from other sources in the vehicle other than the fuse box, however a fuse tap 1025 is a convenient and clean method that does not involve splicing wires.

Figure 17:
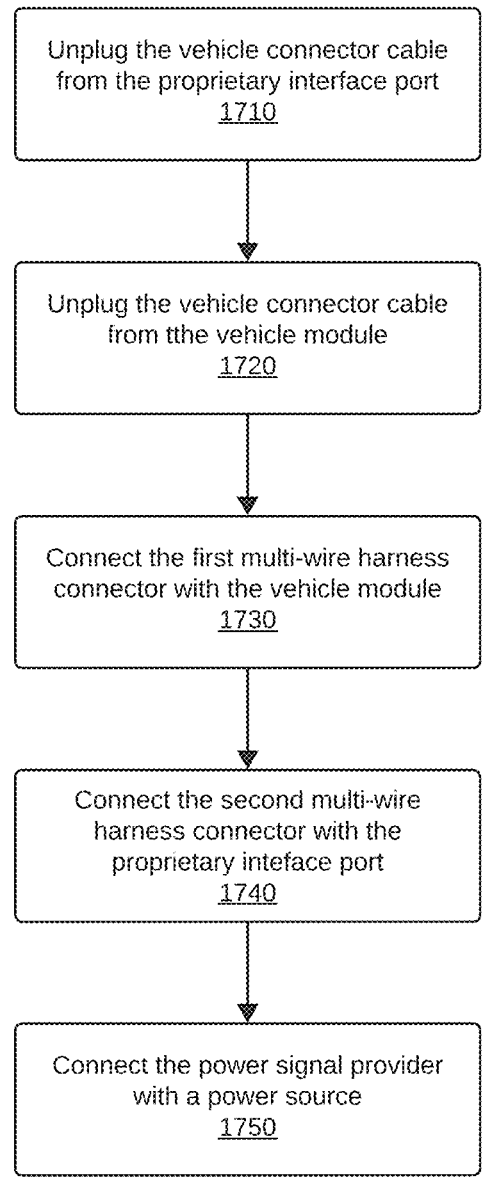
FIG. 17 is a flowchart depicting a method of installing the splitter harness of FIG. 12, in accordance with embodiments of the present disclosure.

A method of installing a splitter harness, such as the T-harness 1000 in a vehicle having a proprietary interface port connected to a vehicle module via a vehicle connector cable is shown in FIG. 17. The splitter harness comprises a main harness segment having a first multi-wire harness connector and a second multi-wire harness connector at both ends thereof. The splitter harness further comprises an OBD port harness segment having an OBD port connector at an end thereof, a splitter signal for splitting a group of signal lines on the main harness segment into a first group of signal lines routed to the second multi-wire harness connector and a second group of signal lines routed to the OBD port harness segment. The splitter harness also comprises a power signal provider for providing power to the OBD port connector. The method starts at step 1710.

At step 1710, the vehicle connector cable is unplugged from the proprietary interface port. For example, with reference to FIG. 8B, this step involves unplugging the male plug 830 from the female receptacle 850 of the proprietary interface port 620.

At step 1720, the vehicle connector cable is unplugged from the vehicle module. For example, with reference to FIG. 8B, this step involves unplugging the female receptacle 820 from the male plug 840.

At step 1730, the first multi-wire harness connector is connected with the vehicle module. For example, with reference to FIG. 10, this step involves connecting the female receptacle 1020 with the male plug 840 of the ECM 160.

At step 1740, the second multi-wire harness connector is connected with the proprietary interface port. For example, with reference to FIG. 10, this involves connecting the male plug 1030 with the female receptacle 850 of the proprietary interface port 620.

At step 1750, the power signal provider is connected with a power source. For example, with reference to FIG. 10, this involves connecting the fuse tap 1025 to a power source such as the fuse box 145.

Embodiments have been described where the techniques are implemented in circuitry and/or computer-executable instructions. It should be appreciated that some embodiments may be in the form of a method or process, of which at least one example has been provided. The acts performed as part of the method or process may be ordered in any suitable way. Accordingly, embodiments may be constructed in which acts are performed in an order different than illustrated, which may include performing some acts simultaneously, even though shown as sequential acts in illustrative embodiments. Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention claimed is:

1. A splitter harness for use in a vehicle having a proprietary interface port and a vehicle module, the splitter harness comprising:
    a main harness segment having:
      a first multi-wire harness connector at a first end thereof, and
      a second multi-wire harness connector at a second end thereof;
    an On-Board Diagnostic (OBD) port harness segment having an OBD port connector at a first end thereof;
    a signal splitter comprising a passive pass-through T-splice, wherein each conductor of the main harness segment remains electrically continuous between the first and second multi-wire harness connectors while being tapped to the OBD port harness segment, such that each signal is replicated to the OBD port connector without interrupting continuity between the in-line connectors for splitting a group of signal lines of the main harness segment into a first group of signal lines routed on the main harness segment to the second multi-wire harness connector and a second group of signal lines routed to a second end of the OBD port harness segment; and
    a power signal provider for providing a power signal from a power source to the OBD port connector.

2. The splitter harness of claim 1, wherein the first multi-wire harness connector is configured for connecting to a vehicle module multi-wire connector of the vehicle module.

3. The splitter harness of claim 2, wherein the first multi-wire harness connector comprises a male plug and the vehicle module multi-wire connector comprises a female receptacle.

4. The splitter harness of claim 2, wherein the first multi-wire harness connector comprises a female receptacle and the vehicle module multi-wire connector comprises a male plug.

5. The splitter harness of claim 1, wherein the second multi-wire harness connector is configured for connecting to a proprietary interface port multi-wire connector of the proprietary interface port.

6. The splitter harness of claim 5, wherein the second multi-wire harness connector comprises a male plug and the proprietary interface port multi-wire connector comprises a female receptacle.

7. The splitter harness of claim 5, wherein the second multi-wire harness connector comprises a female receptacle and the proprietary interface port multi-wire connector comprises a male plug.

8. The splitter harness of claim 1, wherein the power signal provider comprises a power signal line and a fuse tap.

9. The splitter harness of claim 1, wherein the signal splitter comprises a splitter connector located on the main harness segment.

10. The splitter harness of claim 1, wherein the signal splitter comprises a splitter connector which is part of the first multi-wire harness connector.

11. A method of installing the splitter harness of claim 1, wherein the signal splitter comprises a passive pass-through T-splice such that each conductor of the main harness segment remains electrically continuous between the first and second multi-wire harness connectors while being tapped to the OBD port harness segment, replicating each signal to the OBD port connector without interrupting continuity between the in-line connectors, comprising:

unplugging a vehicle connector cable from the proprietary interface port;

unplugging the vehicle connector cable from the vehicle module;

connecting the first multi-wire harness connector with the vehicle module;

connecting the second multi-wire harness connector with the proprietary interface port; and connecting the power signal provider with a power source.

12. The method of claim 11, wherein unplugging the vehicle connector cable from the proprietary interface port comprises unplugging a first multi-wire vehicle cable connector of the vehicle connector cable from a proprietary interface port multi-wire connector of the proprietary interface port.

13. The method of claim 11, wherein unplugging the vehicle connector cable from the vehicle module comprises unplugging a second multi-wire vehicle cable connector of the vehicle connector cable from a vehicle module multi-wire connector of the vehicle module.

14. The method of claim 11, wherein connecting the first multi-wire harness connector with the vehicle module comprises connecting the first multi-wire harness connector with a vehicle module multi-wire connector of the vehicle module.

15. The method of claim 11, wherein connecting the second multi-wire harness connector with the proprietary interface port comprises connecting the second multi-wire harness connector with a proprietary interface port multi-wire connector of the proprietary interface port.

16. The method of claim 11, wherein the power signal provider comprises a power signal line and a fuse tap and wherein connecting the power signal provider with the power source comprises inserting the fuse tap into a slot of a fuse box.

17. The method of claim 11, further comprising plugging a telematics device to the OBD port connector.

* * * * *